United States Patent [19]

Shinkawa et al.

[11] Patent Number: 4,724,951
[45] Date of Patent: Feb. 16, 1988

[54] DEVICE FOR ADJUSTING ADHESIVE FRICTION BETWEEN PALLET AND ENDLESS CHAIN IN A PALLET TYPE MULTI-STATION CONVEYOR

[75] Inventors: Makoto Shinkawa; Hirotada Sugiura, both of Kyoto, Japan

[73] Assignee: Nitto Seiko Co., Ltd., Kyoto, Japan

[21] Appl. No.: 787,746

[22] Filed: Oct. 15, 1985

[30] Foreign Application Priority Data

Oct. 18, 1984 [JP] Japan .................................. 59-220174

[51] Int. Cl.⁴ .............................................. B65G 49/00
[52] U.S. Cl. .................................................. 198/803.01
[58] Field of Search ................ 198/803.01, 343, 465.3; 104/168, 172 R

[56] References Cited

U.S. PATENT DOCUMENTS

| | | | |
|---|---|---|---|
| 2,826,314 | 3/1958 | van der Pyl | 198/465.3 X |
| 3,161,145 | 12/1964 | Cargill et al. | 104/172 R |
| 3,646,656 | 3/1972 | Zilahy et al. | 198/803.01 X |
| 3,767,025 | 10/1973 | Louis | 198/803.01 X |

*Primary Examiner*—Robert J. Spar
*Assistant Examiner*—D. Glenn Dayoan
*Attorney, Agent, or Firm*—Koda and Androlia

[57] ABSTRACT

A pallet type conveyor including elongated frames which constitute linear pathes of pallets with continuously driven endless chains. A pallet is driven with the endless chain by the adhesive friction between rectangular attachments and adhesive friction plates. The pallet has apertures wherein adjusting bolts are respectively and rotatably secured to the pallet and mate with spring stop nuts engaged with coil springs biasing a friction plate. When the adhesive friction between the attachments and the friction plate is needed to be increased in response to a heavier workpiece carried by the pallet, a worker can remove the pallet from the frame and rotate the adjusting bolt clockwise to adjust the elasticity of the spring caused the adhesive friction in response to the workpiece.

3 Claims, 8 Drawing Figures

DEVICE FOR ADJUSTING ADHESIVE FRICTION BETWEEN PALLET AND ENDLESS CHAIN IN A PALLET TYPE MULTI-STATION CONVEYOR

BACKGROUND OF THE INVENTION

1. Field of the Invention

This invention relates to a pallet type multi-station conveyor wherein the pallets are nonsycronously conveyed from station to station by a continuously driven endless chain and particularly a device for adjusting the adhesive friction between a pallet and a endless chain in the pallet conveyor.

2. Prior Art

This type of conventional multi station conveyor comprises elongated frames which constitute a top linear path of the pallets with a continuously driven endless chain and a bottom linear path of the pallets with a reversely driven chain, a pallet transfer unit for lowering a pallet from a top path to a bottom path, and a pallet transfer unit for raising a pallet from a bottom path to a top path. At the top frame along the linear path are supported a plurality of work stations at each given space. Each work station equips a machinery for performing a work function on a workpiece carried by the pallet. Reffering to the prior art shown in FIG. 8, this pallet conveyor 1 includes an elongated frame 2 which constitutes a top linear path 4 of travel of pallets 8 with a continuously endless chain 3 and also provides tracks for rollers 9 of the pallet 8 along the run of the chain 3. At the bottom of the pallet 8 are mounted two idler sprockets 30 which can be easily driven by the chain 3 wherein the sprockets 30 are designed to be locked and attached to the chain 3 or to be unlocked and rotated themselves at their position by the operation of a clutch device 31. When the sprockets 30 rotate by themselves, the pallet 8 stops at its position. On the contrary, when the sprockets 30 are locked not to rotate by themselves, the sprockets 30 and hence the pallet 8 are attached to the chain 3 and are moved with the driven chain 3.

In the above prior art, each pallet 8 of the conveyor 1 needs to be equipped with a clutch device 31 which enables the sprockets 30 to be locked and attached to the chain 3 in order to move the sprockets 30 and hence the pallet 8 with the driven chain 31, and enables the sprockets 30 to rotate at their position in order to locate the pallet 8 at each work station. The clutch device 31 and sprockets 30 cause the pallet 8 very complicated. Besides, a plurality of elongated frames 2 are generally connected one after another in the line to increase the work stations for performing a plurality work functions. In the elongated conveyor 1, the sprocket 30 near the forward edge of the pallet 8 released from the chain 3 sometimes can not engage with a endless chain (not shown) in an adjacent frame and a tooth of the sprocket 30 can get on a cross pin which connects link plate structures of the chain 3. As under this condition, the pallet 8 moves furthermore to next station by means of the engagement between the sprocket 30 near the rear edge of the pallet 8 and the chain 3, so the pallet 8 is carried while its forward edge is lifted up to some extent. This causes a workpiece (not shown) carried by the pallet 8 to be misaligned and to fall down from the pallet 8. Besides, it causes the tooth of sprocket 30 to be broken so that the conveyor 1 gets never to move pallets 8 to workstations. Consequently the machines at the workstations can not continue performing work functions. Furthermore, in the conveyor the sprockets 30 are biased by a spring 32 to release a overload which might be caused to the sprockets 30 being driven by the chain 3 when the pallet 8 is about to be positioned. Therefore, the biased spring 32 must be changed to a proper spring preventing from releasing a load which is caused to the sprocket 30 when the pallet 8 carries a heavier workpiece. This job for chainging the springs can not easily be done without disassembling a pallet 8.

SUMMARY OF THE INVENTION

It is an object of the invention to provide a pallet type conveyor which can convey pallets from workstation to workstation and can nonsyncronously position a pallet at each station without any clutch device and any sprocket to be driven by a endless chain.

It is another object of the invention to provide a conveyor including pallets with adhesive friction plates which are driven with a endless chain by an adhesive friction between the friction plates and rectangular shaped attachments serving as link plate structures of the chain.

It is a further object of the invention to provide a conveyor comprising a plurality of elongated frames which enable pallets to move easily from frame to frame without getting on a cross pin of an endless chain.

It is still a further object of the invention is to provide a conveyor conveying pallets by adhesive friction between attachments of an endless chain and adhesive friction plates mounted in a pallet, which can be adjusted without disassembling the pallets.

In keeping with the principles of the present invention, the object of this inventions are accomplished by a unique pallet type conveyor including elongated frames which constitutes a linear path of travel of pallets with a continuously endless chain and provides tracks for rollers of a pallet, a longitudinal adhesive friction plate attached to rectangular attachment of an endless chain, and longitudinal pallet guide structures which compress the rectangular attachments with the friction plate of the pallet. The pallet has two parallel apertures extending across an endless chain, wherein adjusting bolts are respectively and rotatably secured to the pallet by means of a retainer and mate with spring stop nuts to be moved along the bolts so as to adjust the elasticity of springs biasing the friction plate. By means of this conveyor, the rectangular attachments of a continuously endless chain can be attached to the adhesive friction plates of a pallet and then the pallet can be driven with the chain along the elongated frames. When the pallet is located by an index unit (not shown) and stops moving at a workstation, the endless chain is continuously driven along another frame. The rectangular attachments, however can slip in the friction plate and can move leaving the plate and hence pallet at the station. On the contrary, when the pallet detouchs the index unit, the attachments can be attached to the friction plates with the adhesive friction between the attachments and the friction plates, and then the friction plates and hence the pallet can be conveyed to next station.

In case that a workpiece carried by the pallet is replaced to a heavier one, rotating an adjusting bolt clockwise causes a spring stop nut to be moved along the bolt and to increase the elasticity of a spring. Therefore, the adhesive friction between the attachments and the friction plates is increased so that the pallet can be conveyed without difficulty.

BRIEF DESCRIPTION OF THE DRAWING

The above mentioned features and objects of the invention will become more apparent with reference to the following description taken in conjunction with the accompanying drawings wherein like reference numerals denote like elements and in which.

DETAILED DESCRIPTION OF THE INVENTION

Figure 1:
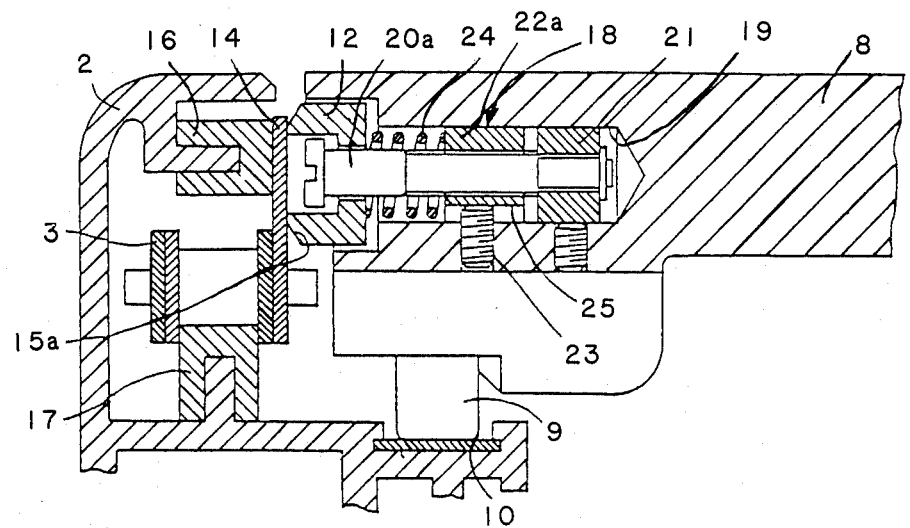
FIG. 1 is a partly diagrammatic sectional view of a pallet type conveyor of the present invention.
Figure 2:
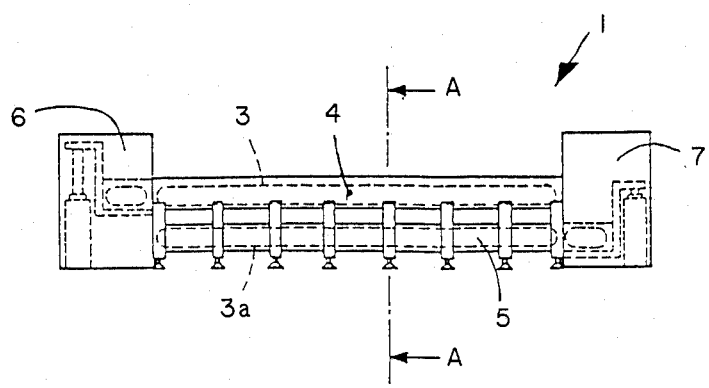
FIG. 2 is a schematic elevational view of a pallet type conveyor of the invention.
Figure 3:
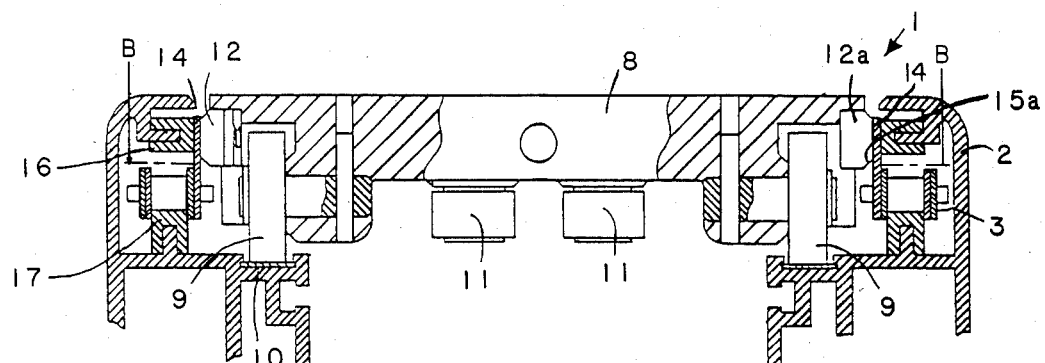
FIG. 3 is a partially cross sectional view, to an enlarged scale and view being taken on the line A—A of FIG. 2.

Referring to an embodiment of the invention illustrated in FIG. 1 through 4, nummeral 1 refers to a pallet type multi-station conveyor which comprises elongated frames 2 which constitute a top linear path 4 of a travel of pallets 8 with a continuously driven endless chain 3 and a bottom linear path 5 with a reversely driven chain 3a, pallet transfer units 6, 7 for lowering a pallet 8 from the exit of a top linear path 4 to the entrance of a bottom path 5 and for raising a pallet 8 from the exit of the bottom path 5 to the entrance of the top path 4. Also, the elongated frame 2 is designed to convey a plurality of pallets 8 and provides tracks for four rollers 9 rotatably secured to the bottom of a pallet 8. In the tracks longitudinal rail plates 10 are replaced for preventing from the worn-out of the rollers 9 of the pallet 8. The pallet 8 equips with cam followers 11 which are respectively located at the bottom near its forward edge and near its rear edge and are in the position symmetric with respect to the center of the pallet 8. The camfollowers 11 are designed to be locked by an index unit (not shown) when the pallet 8 reaches a workstation.

The pallet 8 is also equipped with longitudinal adhesive friction plates 12, 12a at each side of the pallet 8 extending along the frame 2. The friction plates 12, 12a are made of material which has high coefficient of friction to the rectangular shaped attachments 14 mentioned herein after and each plate 12, 12a has inclined sides 15 near the forward edge and near the rear edge respectively so as to facilitate proper entry of the attachments 14 of the chain 3 at the entrance of each elongated frame 2. And it also has longitudinally a inclined bottom surface 15a so as to facilitate proper entry of the attachment 14 at conjunction between two adjacent frames 2, 2.

Incidentally to inner surfaces of each elongated frame 2 are secured longitudinal chain guide structures 16 to be made of material which has a low coefficient of friction relative to the attachments 14.

Figure 5:
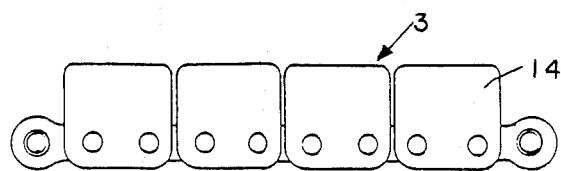
FIG. 5 is a partially elevational view of a endless chain.

The elongated frame 2 is equipped with a chain guide rail 17 on the track along the travel of an endless chain 3 to keep the chain 3 in the straight. Reffering to FIG. 5, the endless chain 3 comprises rectangular shaped attachment structures 14 served as link plate structures between adjacent conventional link structures. The rectangular shaped attachments 14 are designed not to contact each other. In addition, part of the attachments 14 are compressed with the chain guide 16 by the friction plates 12, 12a.

A device 18 for adjusting adhesive friction between a pallet 8 and a endless chain 3 in a pallet type conveyor 1 is described herein. The pallet 8 to be carried along the elongated frame 2 equips with longitudinal adhesive friction plates 12, 12a respectively at each side. The one of the plates 12, 12a is fixed to the pallet 8, while the other is attached to the pallet 8 by means of the device 18 for adjusting the adhesive friction, The device 18 includes adjusting bolts 20a respectively in two aparatures 19, 19 parallelly extending across the adhesive friction plate 12, wherein each adjusting bolt 20a served as a shaft 20 is rotatably secured to the pallet 8 by means of a retainer 21 and mates with a spring stop nut 22a served as a stop ring 22. The stop nut 22a has a longitudinal key thread 25 to be engaged with a upright pin 27 in an aparature 19 so as to move along the bolt 20a without rotating around the bolt 20a. The adjusting bolts 20a also penetrate the friction plate 12 and retain it longitudinally and horizontally. The friction plate 12 is biased by a coil spring 24 which is engaged with the spring stop nut 22a and is replaced surrounding a thread portion of the adjusting bolt 20a so that the elasticity of the spring 24 biasing the friction plate 12 can be adjusted by rotating the adjusting bolt 20a in clock wise or in counter clockwise without disassembling the pallet 8.

In the pallet type conveyor 1 constructed as described above a continuously endless chain 3 is driven along a top elongated frame 2 and the rectangular attachments 14 also move with the chain 3 along the frame 2 because the attachments 14 of the chain 3 are compressed with a chain guide structure 16 by the adhesive friction plates 12 and 12a.

When the pallet 8 is conveyed with the chain 3 along the elongated frame 2 to a index unit (not shown) at a workstation and camfollowers 11 of the pallet 8 are locked by the index unit, so that the pallet 8 stops moving at the station which the chain 3 is continuously driven along the frame 2. The rectangular attachments 14, however can slip in the friction plates 12, 12a and can move along the chain guide structure 16 leaving the friction plates 12, 12a and hence the pallet 8 at the station. The pallet 8 can stay at the station for a work function.

The index unit disengages from the pallet 8 after performing the work function on a workpiece carried by the pallet 8 and the pallet 8 can be conveyed with the chain 3 by the adhesive friction between the attachments 14 and the friction plates 12, 12a.

In case that a workpiece carried by the pallet 8 is replaced to a heavier one, the pallets 8 are removed from the elongated frames 2 and the adjusting bolts 20a are respectively rotated clockwise by a proper tool (not shows) after loosing a set screw 23. This causes a spring stop nut to be moved along the adjusting bolt 20a and to increase the elasticity of a coil spring 24. After increasing the elasticity, the stop nut 22a can be secrued to the pallet 8 by refastening the set screw 23. Then, the pallets 8 are set in the elongated frame 2 and the friction plate 12 is compressed into the pallet 8 to such an extent that the adhesive friction between the rectangular attachments 14 and the friction plate 12 is increased and strong enough to convey 9 heavier workpiece.

Figure 6:
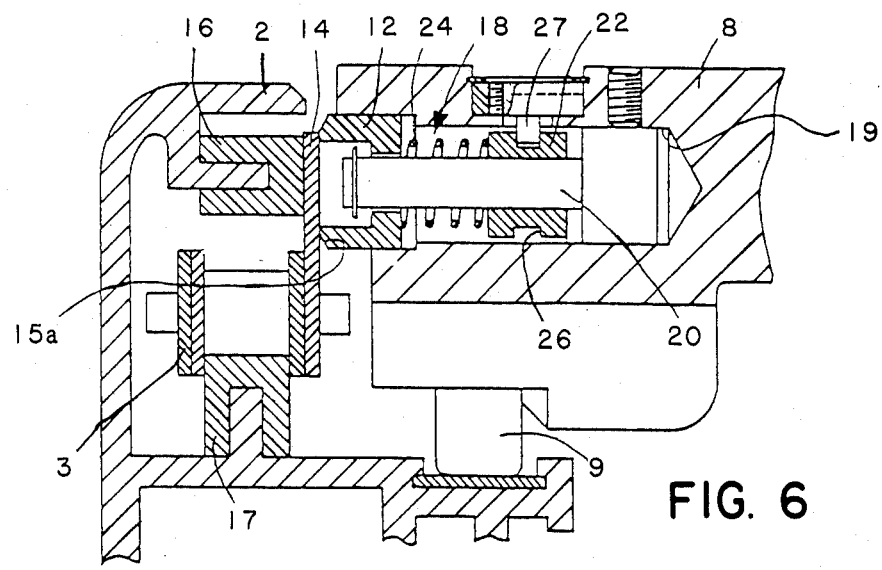
FIG. 6 and 7 are partially cross sectional veiws of pallet type conveyors showning various modifications.
Figure 4:
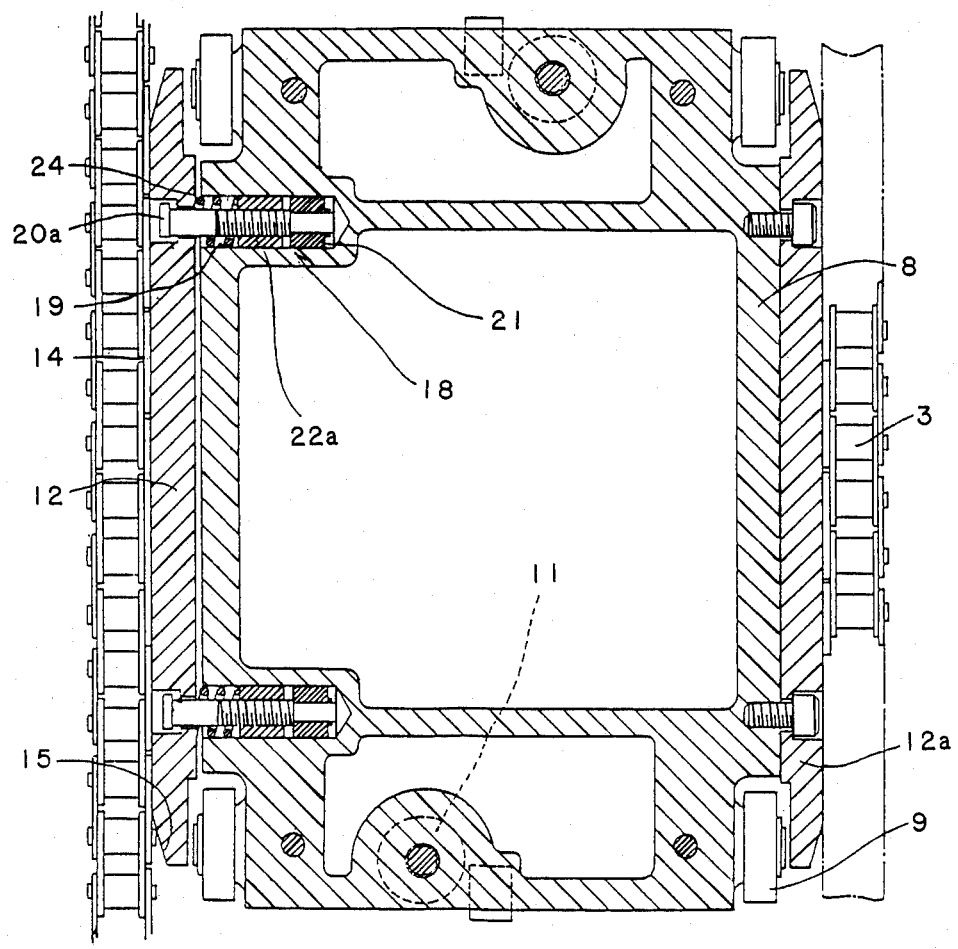
FIG. 4 is a cross sectional view being taken on the line B—B of FIG. 3.

A modified embodiment for the purpose of the invention is shown in FIG. 6. Referring to FIG. 6, a pallet 8 has two parallel apertures 19 (one only shown) extending across an adhesive friction plate 12, wherein a shaft 20 is secured to the pallet 8 by means of a retainer 21. The shaft 20 slidably penetrates a spring stop ring 22 to be engaged with a spring 20 so as to biase the friction plate, so the adhesive friction plate and hence the pallet can be conveyed with the chain by an adhesive friction between the attachments and the friction plate 12. The spring stop ring 22 has a circular recess 26 which is engaged with a pin 27 designed to be moved in a circle trace. This movement of the pin 27 causes the spring stop ring 22 to be moved along the shaft 20.

Figure 7:
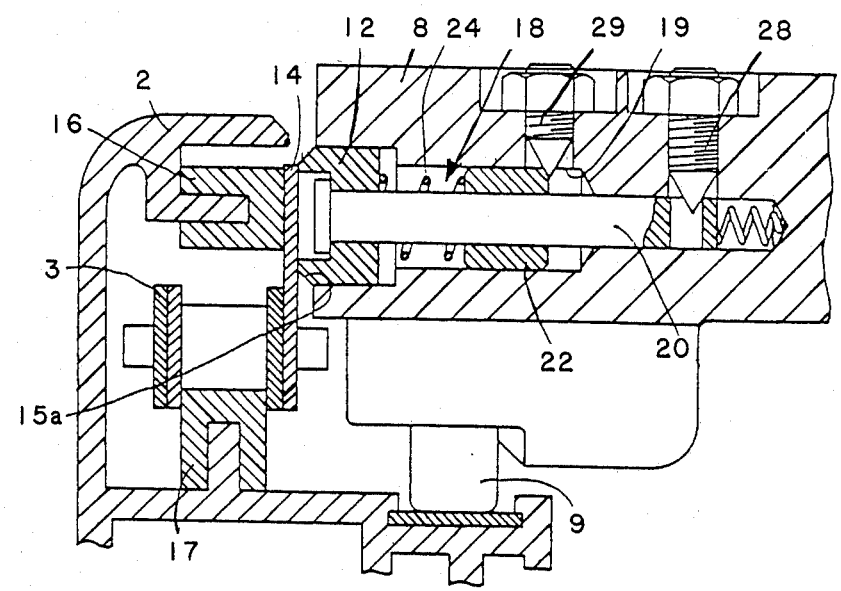
Figure 8:
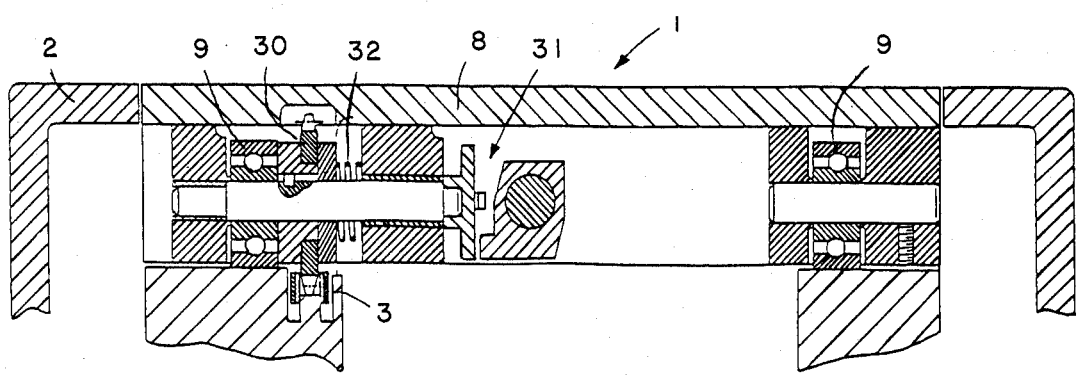
FIG. 8 is a partially cross sectional view of a conventional pallet type conveyor.

Another modified embodiment is shown in FIG. 7. Referring to FIG. 7, a pallet has two parallel apertures 19 (one only shown) extending across an adhesive friction plate 12, wherein a shaft 20 is slidably retained by means of a combination between locate pin 28 with a taper shaped end to be inserted into a through hole of the shaft 22 and a coil spring biasing the shaft 20. The shaft 20 slidably penetrates a spring stop ring 22 engaged with a spring biasing the friction plate and an adjusting pin 29 with a taper shaped end screwed on the pallet 8. Fastening or loosing the adjusting pin 29 causes the stop ring 22 to be moved along the shaft 20 and the elasticity of a coil spring 24 can be increased without difficulty.

We claim:

1. A pallet type conveyor for pallets comprising elongated frames which constitute a top linear path of the pallets, a continuously driven endless chain coupled to the elongated frames, a reversely driven endless chain defining a bottom linear path for the pallets, longitudinal adhesive friction plates provided on the pallets, a chain guide fixed to said elongated frame and rectangular shaped attachments provided as the link plates of said continuously driven endless chains for engaging with said longitudinal adhesive friction plates and said chain guide, whereby the pallets are driven by the adhesive friction between the attachments and the friction plate, said pallet further comprising parallel apertures extending through the adhesive friction plates, coil springs, adjusting bolts which extend though said apertures and which are respectively rotatably secured to the pallet and spring stop nuts which mate with said adjusting bolts which engage with the coil springs for biasing said adhesive friction plates.

2. A pallet type conveyor as set forth in claim 1 further comprising a circular trace on the pallet, a shaft secured to the pallet by means of a retainer and slidably penetrating a spring stop ring engaged with the coil spring biasing the adhesive friction plate, and the stop ring has a circular recess which engages with a pin moving in the circular trace on the pallet.

3. A pallet type conveyor as set forth in claim 1 further comprising a shaft slidably retained by means of a locator pin with a tapered shaped end to be inserted into a through hole of the pallet, and slidably penetrates a spring stop ring engaged with a coil spring biasing the adhesive friction plate, by a contact of an adjusting pin with the tapered shaped end.

* * * * *